United States Patent
Bashir et al.

(10) Patent No.: US 12,087,339 B2
(45) Date of Patent: Sep. 10, 2024

(54) MAGNETIC RECORDING MEDIUM WITH MULTIPLE SOFT UNDERLAYERS AND MAGNETIC RECORDING APPARATUS FOR USE THEREWITH

(71) Applicant: Western Digital Technologies, Inc., San Jose, CA (US)

(72) Inventors: Asif Bashir, San Jose, CA (US); Pierre-Olivier Jubert, San Jose, CA (US); Antony Ajan, San Jose, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,026

(22) Filed: Jul. 25, 2023

(65) Prior Publication Data

US 2024/0135969 A1 Apr. 25, 2024
US 2024/0233763 A9 Jul. 11, 2024

Related U.S. Application Data

(60) Provisional application No. 63/417,622, filed on Oct. 19, 2022.

(51) Int. Cl.
*G11B 5/66* (2006.01)
*G11B 5/00* (2006.01)
(Continued)

(52) U.S. Cl.
CPC .......... *G11B 5/7375* (2019.05); *G11B 5/7369* (2019.05); *G11B 2005/0021* (2013.01)

(58) Field of Classification Search
CPC ........... G11B 5/667; G11B 5/738; G11B 5/66; G11B 5/656; G11B 5/653; G11B 5/65;
(Continued)

(56) References Cited

U.S. PATENT DOCUMENTS 7,862,914 B2  1/2011  Kubota et al.
8,605,555 B1  12/2013 Chernyshov et al.
(Continued)

FOREIGN PATENT DOCUMENTS

JP     2013149328 A    8/2013
WO  WO 2010/026669  *  3/2010 ............. G11B 5/656

OTHER PUBLICATIONS

Weller, Dieter et al., "Review Article: FePt Heat Assisted Magnetic Recording Media", Journal of Vacuum Science & Technology B; Nanotechnology and Microelectronics: Materials, Processing, Measurement, and Phenomena; Oct. 26, 2016; https://d-nb.info/1162060794/34; 2 pages.

*Primary Examiner* — Nabil Z Hindi
(74) *Attorney, Agent, or Firm* — LOZA & LOZA, LLP; Gabriel Fitch

(57) ABSTRACT

Various apparatuses, systems, methods, and media are disclosed for heat-assisted magnetic recording (HAMR) that, in some examples, provide a HAMR medium with two soft underlayers (SULs) on opposing sides of a single heatsink layer. For example, a magnetic recording medium is provided that includes a lower SUL on a substrate. The lower SUL is configured and positioned within the medium to provide a first return path for magnetic flux from a magnetic recording head during a write operation. The medium also includes a heatsink layer on the lower SUL and an upper SUL on the heatsink layer. The upper SUL is configured and positioned within the medium to provide a second return path for magnetic flux from the magnetic recording head. A magnetic recording layer is provided on the upper SUL to store information during the write operation. Additional layers or films may be provided as well.

17 Claims, 11 Drawing Sheets

(51) Int. Cl.
*G11B 5/73* (2006.01)
*G11B 5/78* (2006.01)

(58) Field of Classification Search
CPC ........ G11B 2005/0021; G11B 5/73917; G11B 5/314
USPC .......................................................... 360/59
See application file for complete search history.

(56) References Cited

U.S. PATENT DOCUMENTS

| | | |
|---|---|---|
| 8,941,950 B2 | 1/2015 | Yuan et al. |
| 9,047,926 B2 | 6/2015 | Contreras et al. |
| 9,263,076 B1 | 2/2016 | Peng et al. |
| 9,824,711 B1 * | 11/2017 | Tripathy .............. G11B 5/7377 |
| 10,109,309 B1 | 10/2018 | Jubert et al. |
| 2009/0213494 A1 | 8/2009 | Dai et al. |
| 2012/0251842 A1 | 10/2012 | Yuan et al. |
| 2015/0138939 A1 | 5/2015 | Hellwig et al. |

* cited by examiner

MAGNETIC RECORDING MEDIUM WITH MULTIPLE SOFT UNDERLAYERS AND MAGNETIC RECORDING APPARATUS FOR USE THEREWITH

CROSS-REFERENCE TO RELATED APPLICATIONS

This application claims priority to and the benefit of U.S. Provisional Patent Application No. 63/417,622, filed on Oct. 19, 2022 entitled. "MAGNETIC RECORDING MEDIUM WITH MULTIPLE SOFT UNDERLAYERS AND MAGNETIC RECORDING APPARATUS FOR USE THEREWITH," the entire content of which is incorporated herein by reference as if fully set forth below in its entirety and for all applicable purposes.

FIELD

The disclosure relates, in some aspects, to magnetic recording media and to magnetic recording apparatus for use with magnetic recording media. More specifically, but not exclusively, the disclosure relates to magnetic recording media with soft underlayers (SULs) configured for use with heat-assisted magnetic recording (HAMR).

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, high-definition television (HDTV) receivers, television set top boxes, video game consoles, and portable media players.

A typical disk drive includes magnetic storage media in the form of one or more flat disks. The disks are generally formed of few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic moments stored on the recording layer of the disks.

Heat Assisted Magnetic Recording (HAMR) systems can increase the areal density of information recorded magnetically on various magnetic media. To achieve higher areal density for magnetic storage, smaller magnetic grain sizes (e.g., less than 6 nanometers (nm)) may be required. In HAMR, high temperatures are applied to the media during writing to facilitate recording to the small grains, which have by design high magnetic anisotropy. The high temperatures may be achieved using a near field transducer that is coupled to a laser diode of a slider of a HAMR disk drive.

At least some magnetic recording media for use with HAMR employ a soft underlayer (SUL) beneath the magnetic recording layer(s) that provides a return path for magnetic flux from a magnetic recording head of the slider during a write operation. Aspects of the present disclosure are directed to configuring and positioning such SUL layers.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium is provided that includes: a substrate; a first soft underlayer (SUL) on the substrate, wherein the first SUL is configured and positioned within the magnetic recording medium to provide a first return path for magnetic flux; a heatsink layer on the first SUL; a second SUL on the heatsink layer, wherein the second SUL is configured and positioned within the magnetic recording medium to provide a second return path, different from the first return path, for magnetic flux; and a magnetic recording layer on the second SUL. The magnetic recording medium may be a Heat Assisted Magnetic Recording (HAMR) medium.

In another embodiment, a magnetic recording medium is provided that includes: a substrate; an adhesion layer directly on the substrate; a first SUL directly on the adhesion layer; a heatsink layer directly on the first SUL; a second SUL on the heatsink layer; and a magnetic recording layer on the second SUL. The magnetic recording medium may be a HAMR medium.

In another embodiment, a magnetic recording apparatus the provided that includes a magnetic recording head; and a magnetic recording medium comprising: a substrate; a first SUL on the substrate, wherein the first SUL has a top surface no farther than 125 nm from the magnetic recording head while the magnetic recording head is positioned to write data to the magnetic recording medium; a heatsink layer on the first SUL; a second SUL on the heatsink layer, wherein the second SUL has a top surface no farther than 40 nm from the magnetic recording head while the magnetic recording head is positioned to write data to the magnetic recording medium; and a magnetic recording layer on the second SUL. The magnetic recording apparatus may be a HAMR apparatus.

In another embodiment, a method for manufacturing a magnetic recording medium is provided. The method includes: providing a substrate; providing an adhesion layer directly on the substrate; providing a first soft underlayer (SUL) directly on the adhesion layer: providing a heatsink layer directly on the first SUL; providing a second SUL on the heatsink layer; and providing a magnetic recording layer on the second SUL. The magnetic recording medium that is fabricated may be a HAMR medium.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

Figure 1:
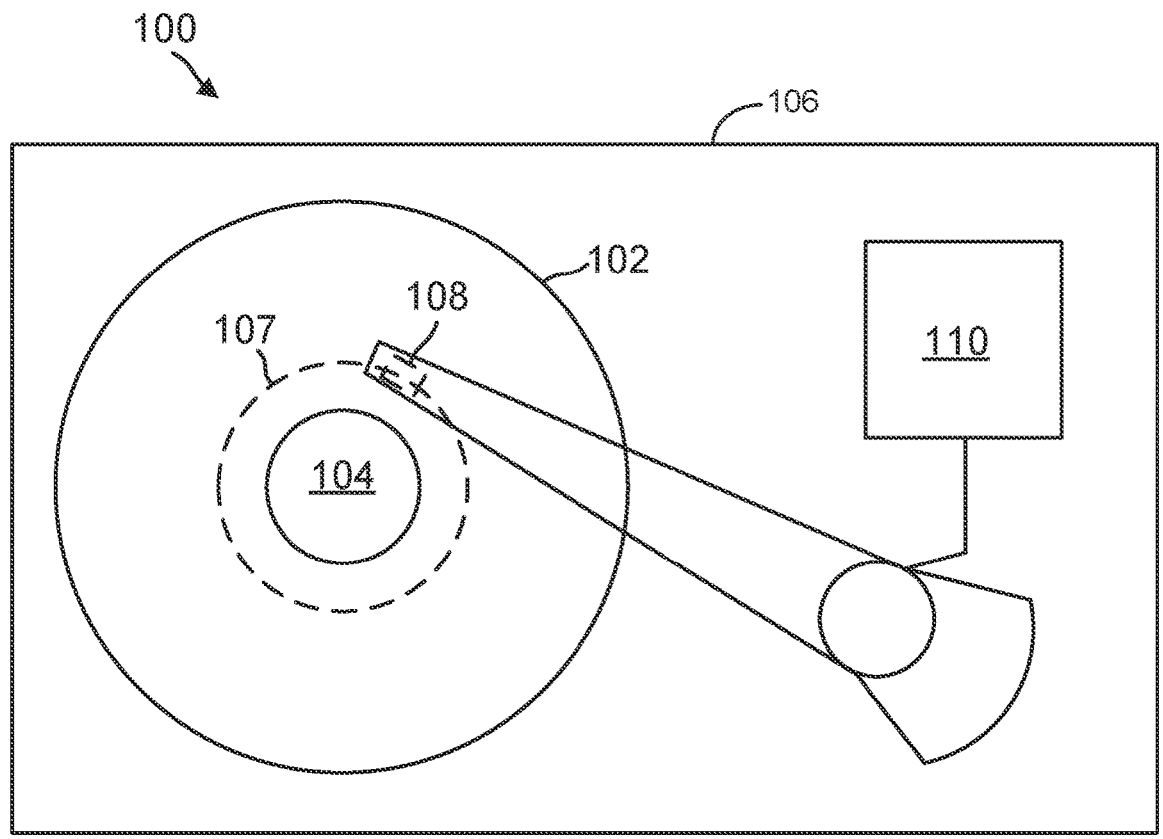
FIG. 1 is a top schematic view of an exemplary disk drive configured for heat-assisted magnetic recording (HAMR) including a slider and a HAMR medium that includes at least two soft underlayers (SULs) on opposing sides of a single heatsink layer, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing a magnetic recording medium such as a Heat-Assisted Magnetic Recording (HAMR) medium that can, among other features, increase the magnetic field strength achieved within its magnetic recording layers during a write operation while also providing for good thermal characteristics, layer deposition characteristics, and other features. In some aspects, these features are achieved by employing at least two soft underlayers (SULs) on opposing sides of a heatsink layer, e.g., a dual SUL HAMR media.

Before discussing the dual SUL HAMR media, a HAMR media with a single SUL will be described. An illustrative single SUL HAMR medium may include the following layers (in order from bottom to top): a substrate, an adhesion layer to reduce delamination of subsequently-deposited layers; a single SUL to provide a return path for magnetic flux from a magnetic recording head during a write operation; a heatsink layer to control flow of heat within the HAMR media (especially lateral heat flow); a seed layer to facilitate the growth of granular magnetic recording layer(s) and further provide a thermal barrier between the recording layer and the heatsink layer; granular magnetic recording layer(s); a magnetic capping layer that assists magnetization reversal of the magnetic grains in the granular magnetic recording layer(s); and an overcoat, such as carbon overcoat (COC). In some examples, the seed layer is made of an MgO layer, an MgO—TiO (MTO) layer, or appropriate oxide layers, or multilayers of the same materials. Within the illustrative HAMR medium, the SUL provides the closest flux closure loop for a magnetic write head.

In an exemplary HAMR system, the write head includes a main pole and one or more return poles. For a HAMR system, the return poles are often about 500 nm from main pole tip, as opposed to a perpendicular magnetic recording (PMR) system where the distance between poles is often less than 20 nm. Given the relatively large distance of 500 nm for a HAMR system, it is important to design and configure the HAMR media to enhance its writability. Within such media, the Write Head to SUL distance (HUS) is often large, e.g., 120 nm or greater, due to the thickness of the many layers interposed between the top of the SUL and the top of the HAMR media, e.g., the heatsink layer, seed layer. MTO layer, MgO layer, etc. Since the HUS is large, the SUL is often made fairly thick to compensate for its distance from the write head pole so as to maximize the magnetic write field within the magnetic recording layer(s) to achieve write saturation within those layer(s). For example, the SUL may be 80 nm thick. A thick SUL, however, can be difficult to deposit. Thus, the strength of the magnetic flux within the magnetic recording layer(s) during a write operation cannot generally be increased by providing an SUL that is thicker than 80 nm without also encountering SUL deposition issues.

Accordingly, it is desirable to provide a HAMR media configured to increase the magnetic field strength within its magnetic recording layers during a write operation without requiring the deposition of a thicker SUL (and while also still achieving good thermal characteristics, etc., within the HAMR media).

Herein, a magnetic recording medium is provided that, in one aspect, includes: a substrate; a first SUL on the substrate, wherein the first SUL is configured and positioned within the magnetic recording medium to provide a first return path for magnetic flux (e.g., from a magnetic recording head during a write operation); a heatsink layer on the first SUL; a second SUL on the heatsink layer, wherein the second SUL is configured and positioned within the magnetic recording medium to provide a second return path, different from the first return path, for magnetic flux (e.g., from the magnetic recording head during the write operation); and a magnetic recording layer on the second SUL (e.g., configured to store information during the write operation).

Thus, in some aspects, two SUL layers are provided, one below the heatsink and another above the heatsink. The upper (second) SUL may be much thinner than the lower (first) SUL and may be deposited, for example, above heatsink but below the seed layer and hence also below the magnetic recording layer(s). The addition of the upper (second) SUL serves to increase the magnetic field strength within the magnetic recording layer(s) during a write operation as compared to a corresponding medium that has only the lower SUL below the heatsink. In an illustrative example, the upper (second) SUL is 25 nm thick. The lower (first) SUL may be, in one example, 55 nm thick and, in another example, 80 nm thick.

In this manner, the magnetic field strength within the magnetic recording layer(s) during a write operation may be increased without requiring a corresponding increase in the thickness of the lower SUL and, in some examples, while allowing for a significant decrease in its thickness (e.g., from 80 nm to 55 nm). In some examples, a 10-15% increase in the magnetic field strength within the magnetic recording layer(s) is achieved as compared to a HAMR medium that has only the lower SUL below the heatsink. Notably, in these examples, there is only a single heatsink layer, which is between the lower (first) SUL and the upper (second) SUL. No separate heatsink layer is required below the lower (first) SUL.

Illustrative Examples and Embodiments

FIG. 1 is a top schematic view of a data storage device 100 (e.g., disk drive or magnetic recording device) configured for magnetic recording and comprising a slider 108 and a magnetic recording medium 102. In illustrative examples, the magnetic recording medium 102 includes a HAMR medium that includes at least two SULs (not shown in FIG. 1, but see FIG. 3). The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data are accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including shingle-written magnetic recording (SMR) media, perpendicular magnetic recording (PMR) media, or microwave assisted magnetic recording (MAMR) media.

Figure 2:
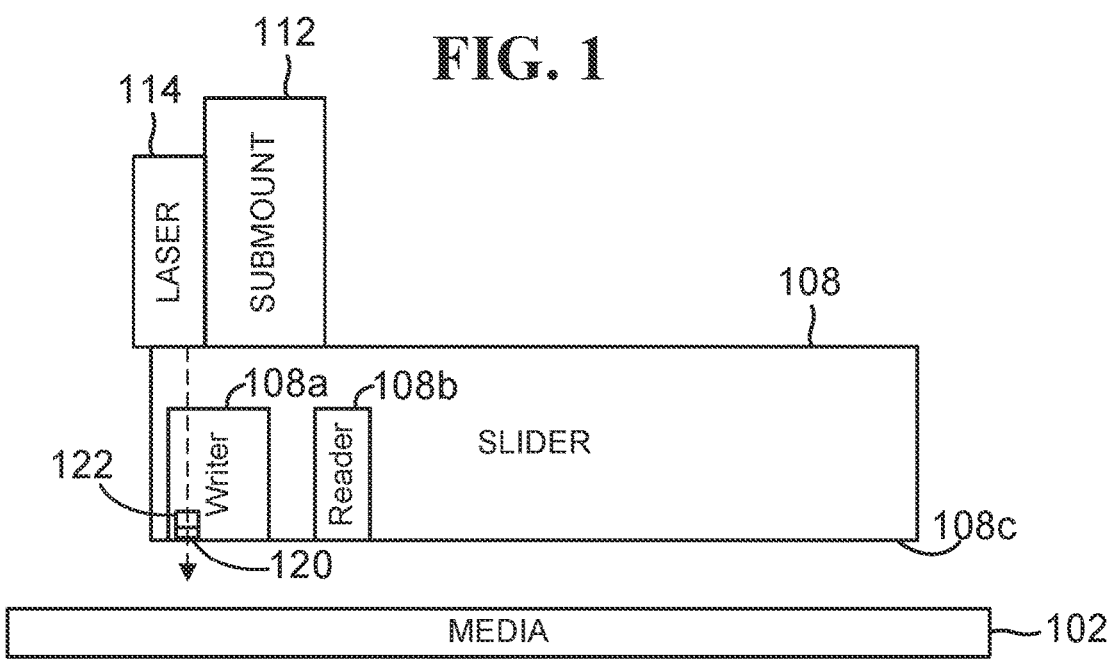
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 includes at least two SULs (not shown in FIG. 1 but see FIG. 3). The slider 108, which may also be referred to as a head, may comprise a sub-mount 112 attached to a top surface of the slider 108. The laser 14 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a. The anticipated recording temperature is in the range of about 350° C. to 400° C. In the aspect illustrated in FIG. 2, the laser directed light is disposed within the writer 108a and near a trailing edge of the slider. In other aspects, the laser directed light may instead be positioned between the writer 108a and the reader 108b. FIGS. 1 and 2 illustrate a specific example of a HAMR system. In other examples, the magnetic recording medium 102 can be used in other suitable HAMR systems (e.g., with other sliders configured for HAMR).

Figure 3:
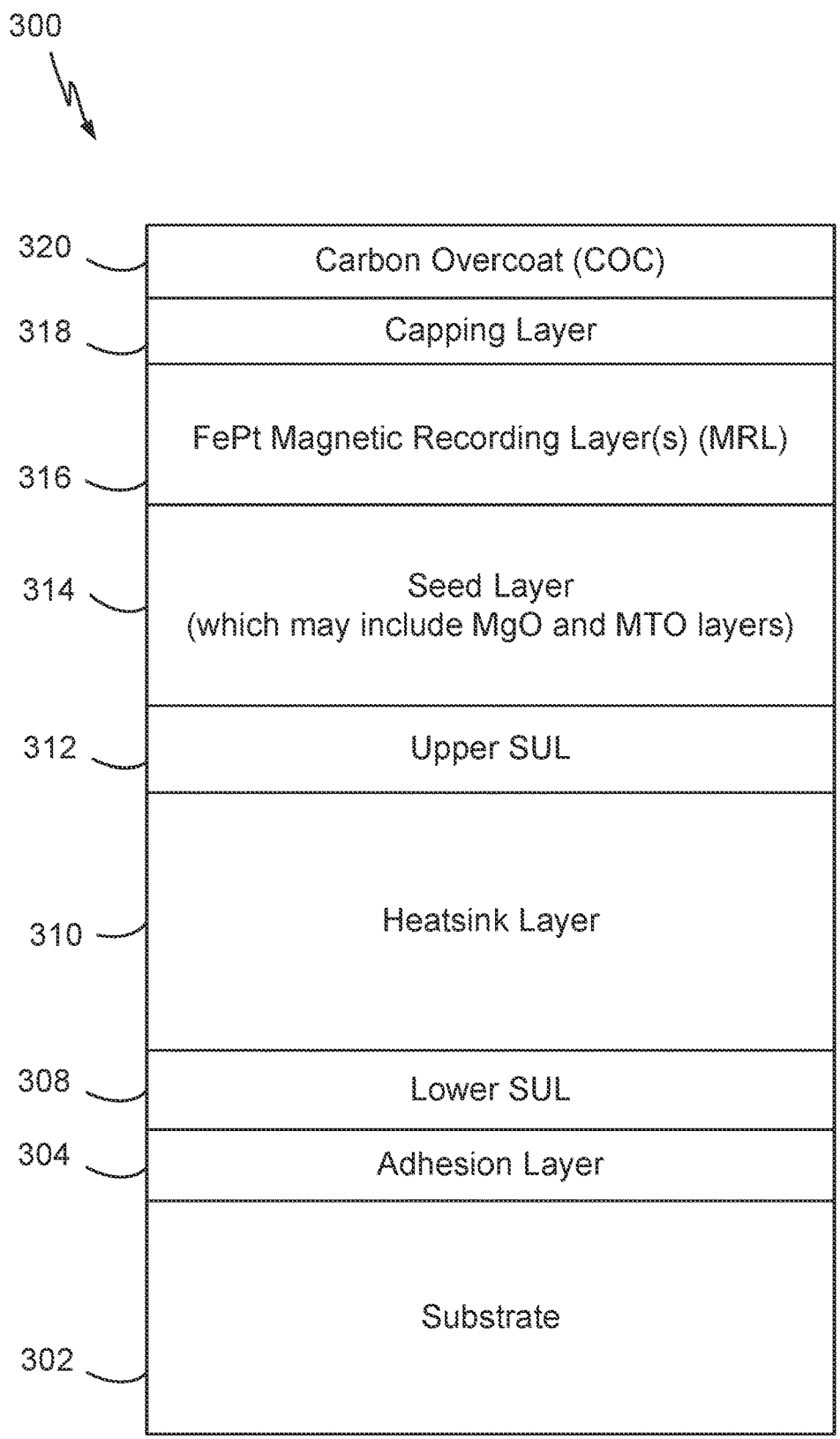
FIG. 3 is a side schematic view of an exemplary HAMR medium that includes, among other layers, two SULs on opposing sides of a single heatsink layer, in accordance with an aspect of the disclosure.

FIG. 3 is a side schematic view of an exemplary HAMR medium 300 that includes two SULs on opposing sides of a heatsink layer in accordance with an aspect of the disclosure. The HAMR medium 300 of FIG. 3 has a stacked structure with a substrate (which may be formed, e.g., of glass or a glass ceramic) 302 at a bottom/base layer, an adhesion layer 304 (which may be formed, e.g., of NiTa) on the substrate 302, a first (lower) SUL 308 (which may be formed, e.g., of CoZrWMo) on the adhesion layer 304, a heatsink layer 310 (which may be formed, e.g., of Cr) on the lower SUL layer 308, a second (upper) SUL 312 (which may be formed, e.g., of CoZrWMo) on the heatsink layer 310, a seed layer 314 (which may include MgO and MTO layers, as discussed above, with the MgO layer on top of the MTO layer) on the upper SUL 312, a magnetic recording layer (MRL) 316 (which may be formed, e.g., of FePt) on the seed layer 314, a capping layer 318 (which may be formed, e.g., of CoFe) on the MRL 316, and a COC 320 on the capping layer 318. Although not shown, an additional lubricant layer may be on the COC layer 320. Note that the layers in FIG. 3 (and in other figures herein) are not shown to scale.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

In some aspects, the layers have the following thicknesses: the substrate 302 thickness is in the range of 0.5 mm to 0.635 mm; the adhesion layer 304 thickness is in the range of 45 nm to 180 nm; the lower SUL 306 thickness is in the range of 55 nm to 80 nm; the heatsink layer 310 thickness is in the range of 55 nm to 100 nm; the upper SUL 312 thickness is about 25 (and in the range of 10 nm to 30 nm); the seed layer 314 thickness is in the range of 2 nm to 5 nm (and is made of MgO, or alternatively of MgO—TiO, or of other appropriate oxide layer that promotes FePt ordering and provides good thermal barrier resistance between the recording layer and the heatsink layer); the MRL structure that may be, e.g., 100-200 Å thick; the capping layer 318 thickness is in the range of 1 nm to 3 nm; the COC 320 thickness is in the range of 30 angstroms (Å) to 40 A; the lubricant layer thickness (if provided) is in the range of 7 Å to 9.5 Å.

In some examples, the substrate 302 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302 may be made of one or more materials such as an Al alloy. NiP-plated Al, glass, glass ceramic, and/or combinations thereof.

In some aspects, the adhesion layer 304 (which might alternatively be referred to as a pre-seed layer) is used to reduce delamination of layers or films deposited over the adhesion layer. The adhesion layer 304 may be a metallic alloy, such as NiTa (as shown), etc.

In some aspects, the lower SUL 308 may be configured with CoZrWMo. In other examples, the lower SUL 308 can be made of one or more other soft magnetic materials, such as Co, Fe. or Ni with one or more of W, Mo, Ta, Nb, Cr, B, Si, or C, or combinations thereof. Thus, in some aspects, the lower SUL 308 can be made of metallic materials such as CoZrWMo, CoW. NiFe, or CoNiFe, or combinations thereof. In some examples, additional non-metallic materials can be added to the metallic materials, such as CrTa or $ZrO_2$. In some examples, the SUL is formed of Co or CoFe alloys with Zr, B, Ta, W, Mo additives (to make the layer soft magnetic and amorphous). The lower SUL 308 may be an amorphous compound with no anisotropy. The lower SUL 308 may be configured and positioned to support magnetization of the magnetic recording layer structure 316 during data storage operations. More specifically, the lower SUL 308 may be configured and positioned to provide a first return path for a magnetic field applied during a write operation. Although various materials may be used to form the lower SUL 308, the lower SUL 308 is preferably configured with a material that has a saturated magnetic flux density (Bs) greater than 1.2 Tesla (T) and, for example, has a Bs in the range of 1.4 T to 1.6 T. CoZrWMo is one example of a material that has such a high Bs value.

In some aspects, the heatsink layer 310 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the upper SUL 312 may be configured, at least with respect to material composition, the same as the lower SUL 308. That is, the upper SUL 312 may be formed with CoZrWMo. In other examples, the upper SUL 312 can be made of one or more other soft magnetic materials, such as Co, Fe, Ni with one or more of W, Mo, Ta, Nb, Cr, B. Si, Zr, or C, or combinations thereof. The upper SUL 312 may be an amorphous compound with no anisotropy. The upper SUL 312 may be configured and positioned to further support magnetization of the magnetic recording layer structure 316 during data storage operations. More specifically, the upper SUL 312 may be configured and positioned to provide a second return path for a magnetic field applied during the write operation. As with the lower SUL 308, the upper SUL 312 is preferably configured with a material that has a Bs value greater than 1.2 T and, for example, has a Bs in the range of 1.4 T to 1.6 T. CoZrWMo is again an example of a material that has such a high Bs value.

Although the lower SUL 308 and the upper SUL 312 may be formed of the same materials, they need not be the same and, in some examples, the two SUL layers may be formed of different materials. The upper SUL 312 should be configured with low thermal conductivity to act as a thermal barrier rather than a heatsink. Still further, the upper SUL 312 should be placed as close to the top of the media as feasible (and hence as close to the write head as feasible). The upper SUL 312 should also be kept fairly thin (e.g., less than 30 nm), since a thicker upper SUL may block heat to the heatsink and reduce the thermal gradient. The thermal gradient is a measure of the heat profile into the media that is generated from the NFT. In general, a higher gradient is preferred. The upper SUL 312 and various other layers such as MgO and MTO can be configured and positioned to achieve a desired thermal gradient, among other thermal performance parameters.

In some aspects, the seed layer 314 is used to create a growth template for the subsequently-deposited films including the heatsink layer 310 and the MRL 316 and to provide a correct crystallographic orientation, e.g., $L1_0$. Functional goals for the seed layer 314 include small grain size and good crystallographic texture, both of which may be desirable for good media recording performance. In some aspects, the seed layer 314 may include an MTO layer to assist in nucleation so as to permit proper crystal growth within the MRL 316 so that the MRL 316 will have good crystallographic texture with small grains. In some aspects, the seed layer may include an MgO layer to assist in nucleation to permit proper crystal growth within the MRL 316 and to provide a thermal barrier in combination with an MTO layer.

In some aspects, the MRL 316 includes one or more magnetic recording layers for storing data magnetically, not explicitly shown in in FIG. 3. For example, the MRL 316 may include magnetic recording sub-layers and exchange control sub-layers (ECLs). Collectively, the sub-layers form an MRL structure 316 that may be, e.g., 100-200 A thick. In some aspects, the MRL 316 may be made of FePt. In some aspects, the MRL 316 may be made instead of an alloy selected from FePtY, where Y is a material selected from Cu, Ni, and combinations thereof. In other aspects, the MRL 316 may be made instead of a CoPt alloy. In some aspects, the MRL 316 may be formed of high anisotropy $L1_0$ FePt with segregants such as C, BN, $SiO_2$, Ag. and combinations thereof. In some aspects, the MRL is a four layer MRL. Each layer of the MRL may have segregants with the amount of segregant varying from layer to layer within the MRL.

In some aspects, the capping layer 318 is magnetic and may be made of CoFe, CoPt, CoPd, just Co, or other suitable materials known in the art.

In some aspects, if a lubricant layer is also provided on the COC 320, the lubricant layer (not shown in the figure) may be made of a polymer-based lubricant material.

Notably, FIG. 3 illustrates an illustrative example of a HAMR stack with a particular combination and arrangement of layers. In other examples, more or fewer layers may be provided. For example, in some examples, the MTO might be omitted or the adhesion layer might be omitted. In other examples, additional layers or films might be provided, such as a thermal resistive layer (which may be formed, e.g., of $RuAlTiO_2$) above the heatsink and below the upper SUL. In some cases, the sequential positioning of the SULs within the layers can be varied. For example, the upper SUL might be positioned above the MTO/MgO or the seed layer might be below the heatsink but above the lower SUL. Generally speaking, there may be various tradeoffs in different aspects of performance (e.g., thermal performance vs. magnetic performance) to the various arrangements.

Figure 4:
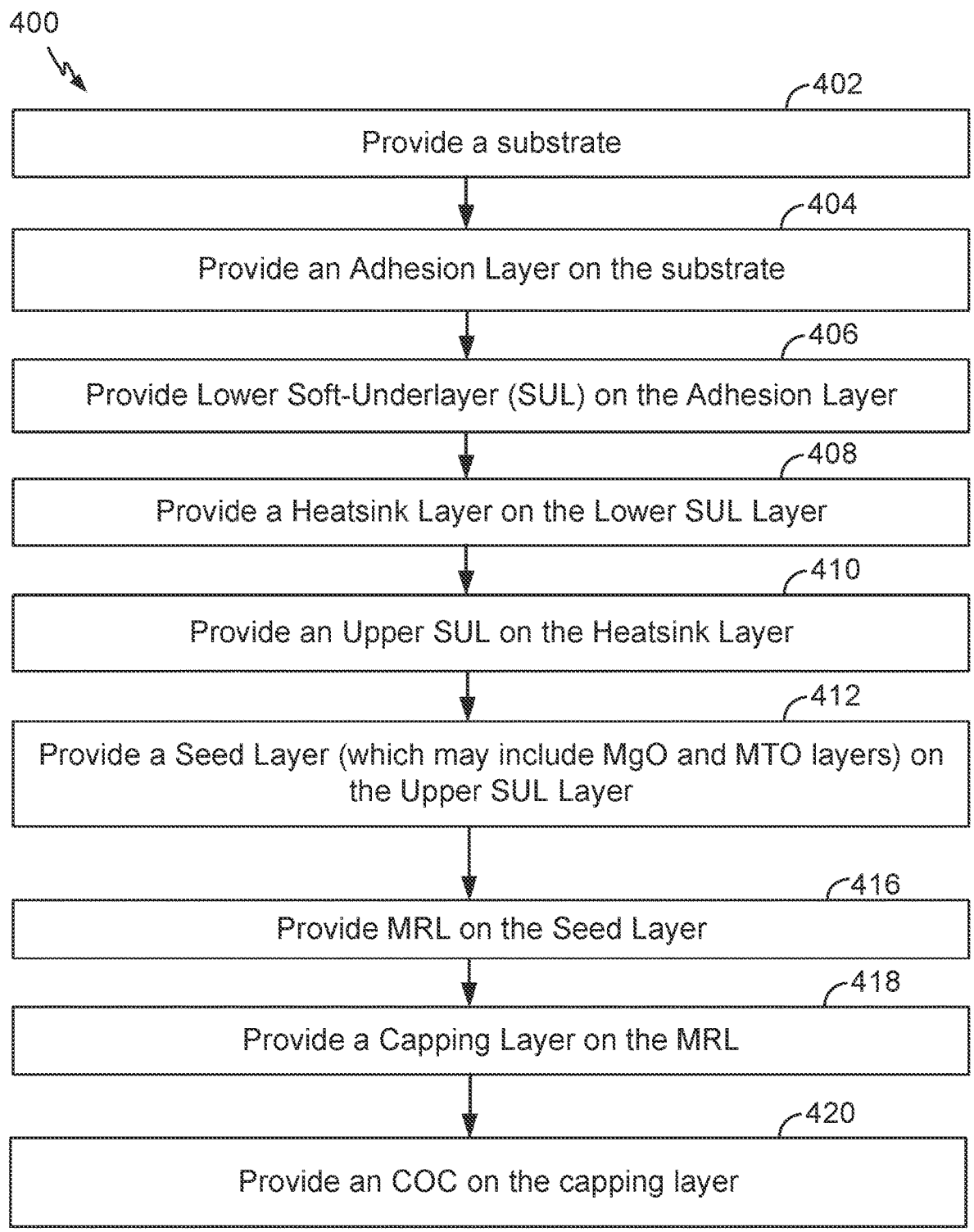
FIG. 4 is a flowchart of an exemplary process for fabricating a HAMR medium that includes, among other layers, two SULs on opposing sides of a single heatsink layer, in accordance with an aspect of the disclosure.

FIG. 4 is a flowchart of a process 400 for fabricating a HAMR medium that includes at least two SULs on opposing sides of a heatsink layer in accordance with some aspects of the disclosure. In one aspect, the process 400 can be used to fabricate the HAMR media described above in relation to FIG. 3. In block 402, the process provides a substrate. In block 404, the process provides an adhesion layer (which may be formed, e.g., of NiTa) on the substrate. In block 406, the process provides a first (lower) SUL on the adhesion layer (which may be formed, e.g., of CoZrWMo). In block 408, the process provides a heatsink layer (which may be formed, e.g., of Cr) on the lower SUL. In block 410, the process provides a second (upper) SUL (which may be formed, e.g., of CoZrWMo) on the heatsink layer. In block 412, the process provides a seed layer (which may include MgO and MTO layers as discussed above) on the upper SUL. In block 416, the process provides an MRL on the seed layer. In block 418, the process provides a capping layer (which may be formed, e.g., of CoFe) on the MRL. In block 420, the process provides a COC on the capping layer and then preferentially etches the COC. Although not shown, the process may also provide a lubricant layer on the COC. Additional or alternative exemplary materials are listed above.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. The deposition of at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD) besides PECVD, low pressure chemical vapor deposition (LPCVD) and atomic layer chemical vapor deposition (ALCVD). In other aspects, other suitable deposition techniques known in the art might also be used.

Figure 5:
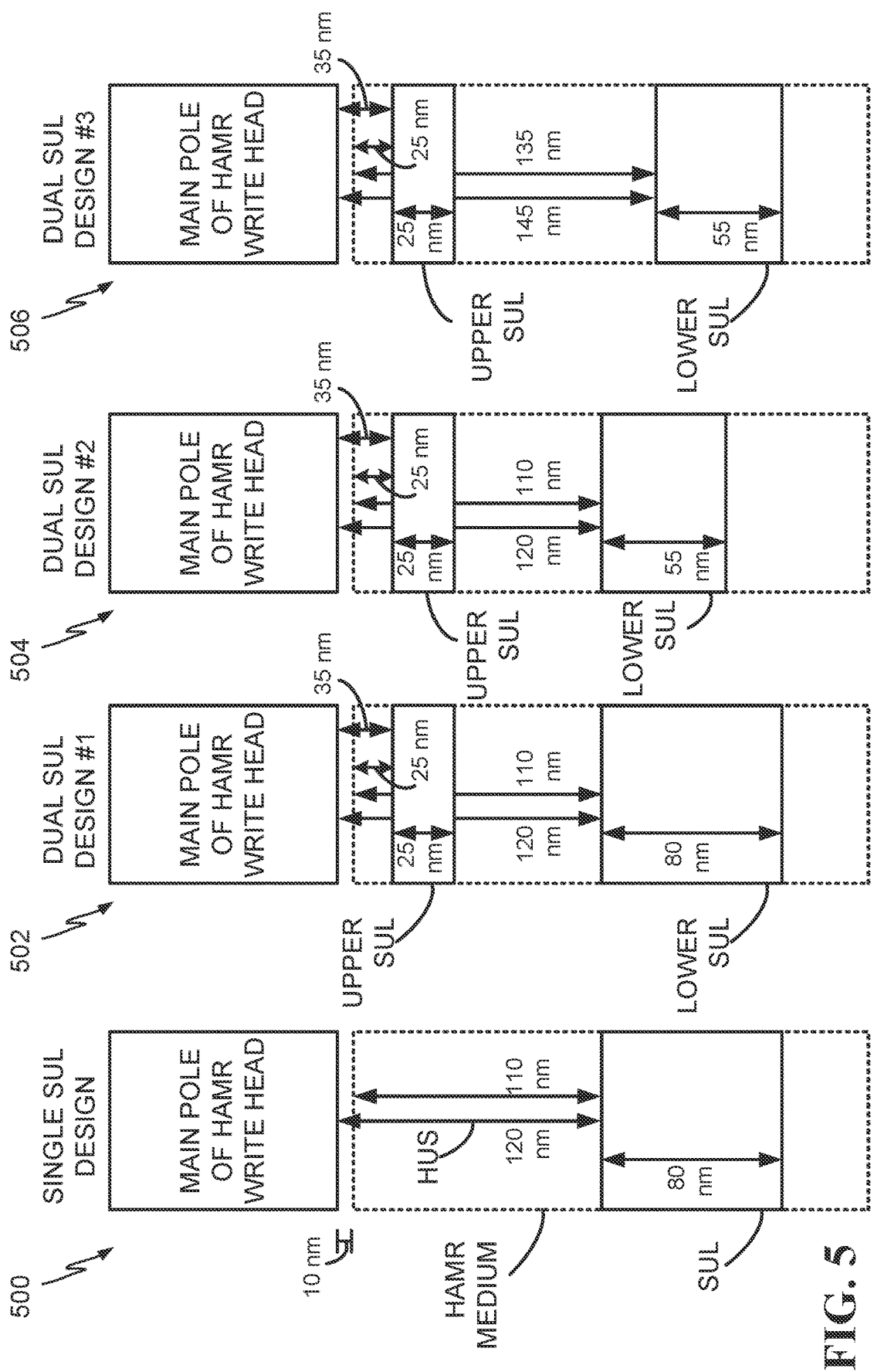
FIG. 5 are side schematic views of exemplary HAMR media and HAMR write heads, wherein the HAMR media include, in some examples, two SULs, in accordance with an aspect of the disclosure.

FIG. 5 consists of side schematic views of four exemplary HAMR media that highlight upper and lower SULs and illustrate exemplary HUS values and other distance or thickness parameters. As far as magnetic write performance is concerned, an important parameter is the distance from the top surface of the SUL to the main pole of the write head of the HAMR drive, i.e., the HUS value. From a media fabrication standpoint, a key parameter is the distance from the top surface of the SUL to the top of the HAMR media stack since, with proper selection of that distance in conjunction with the head to media spacing (HMS) during writing, the top surface of the SUL can be set to the proper HUS value to maximize magnetic write performance. In each of the examples of FIG. 5, the HMS is 10 nm. In other HAMR drives, the HMS may be different. Note that within FIG. 5, each HAMR media stack is shown in dashed lines with only the SULs illustrated in solid lines. That is, FIG. 5 does not illustrate the various other layers and films within the HAMR medium. See, again, FIG. 3 for an illustrative example that includes the various other layers and films.

Design 500 is a HAMR medium with a single SUL. In this example, the SUL has a thickness of 80 nm with its top surface positioned 120 nm from the main pole of the write head (i.e., the HUS is 120 nm) and with its top surface positioned 110 nm from the top of the HAMR medium stack. Although not show in FIG. 5, a heatsink layer is above the single SUL. See, again, FIG. 3.

Design 502 is a first exemplary dual SUL HAMR medium. In this example, the lower SUL is configured and positioned the same as the single SUL of design 500; that is, the lower SUL has a thickness of 80 nm with its top surface positioned 120 nm from the main pole of the write head and 110 nm from the top of the HAMR medium stack. The upper SUL of design 502 has a thickness of 25 nm with its top surface positioned 35 nm from the main pole of the write head (i.e., HUS is 35 nm) and 25 nm from the top of the HAMR medium stack. Although not show in FIG. 5, a heatsink layer is below the upper SUL and above the lower SUL, and an MRL is above the upper SUL. See, again, FIG. 3. By providing the dual SUL configuration of design 502, improvements in magnetic performance can be achieved as compared to the single SUL of design 500. In some examples, the strength of the magnetic field within the MRL in design 502 is 10-15% greater than with the single SUL design 500.

Design 504 is a second exemplary dual SUL HAMR medium. In this example, the lower SUL has a thickness of 55 nm with its top surface positioned 120 nm from the main pole of the write head and 110 nm from the top of the HAMR medium stack. The upper SUL of design 503 again has a thickness of 25 nm with its top surface positioned 35 nm from the main pole of the write head (i.e., HUS is 35 nm) and 25 nm from the top of the HAMR medium stack. Although not show in FIG. 5, a heatsink layer is again provided below the upper SUL and above the lower SUL, and an MRL is provided above the upper SUL. See, again, FIG. 3. Despite using a thinner SUL as the lower SUL (e.g., 55 nm vs. 80 nm), good magnetic performance can be achieved as compared to the single SUL of design 500 with its 80 nm SUL.

Design 506 is a third exemplary dual SUL HAMR medium. In this example, the lower SUL again has a thickness of 55 nm but its top surface is positioned 145 nm from the main pole of the write head and 135 nm from the top of the HAMR medium stack. The upper SUL of design 504 again has a thickness of 25 nm with its top surface positioned 35 nm from the main pole of the write head (i.e., HUS is 35 nm) and 25 nm from the top of the HAMR medium stack. Although not show in FIG. 5, a heatsink layer is again provided below the upper SUL and above the lower SUL, and an MRL is provided above the upper SUL. See, again, FIG. 3. By positioning the lower SUL further from the upper SUL, a thicker heatsink layer is accommodated by this particular design.

Thus FIG. 5 illustrates various examples of dual SUL designs. The other layers of the HAMR stack are not explicitly shown in the figure to emphasize that various different combinations or arrangements of other HAMR layers can be provided within the available spaces between the SULs of FIG. 5. Examples of such other layers are shown in FIG. 3. From the standpoint of magnetic write performance, the upper and lower SULs may be configured and positioned as shown in FIG. 5 to have HUS values that optimize (or at least improve) magnetic write performance. The other layers can be configured and positioned above, below, or between the SUL layers to achieve other goals. For example, design 506 accommodates a thicker heatsink layer, which may have advantages in some HAMR drives. Design 504 may permit the overall HAMR stack to be thinner than the HAMR stack of design 502 while using a heatsink of the same thickness. As such, there is considerable flexibility in the design of the HAMR stacks. Moreover, at least some of the dual SUL designs benefit from being relatively thin (e.g., 55 nm rather than 80 nm). As discussed above, there are advantages during deposition to having a thinner SUL.

In some aspects, once the expected HMS is known, the HAMR stack may be designed to achieve desired HUS values by selecting the thicknesses of the various layers of the HAMR stack to place the top surfaces of the upper and lower SULs at the desired HUS positions. Depending upon the particular embodiment, this may involve setting or adjusting the thicknesses of other layers (such as the heatsink layer) to locate the SULs at a particular depth within the HAMR stack to provide the desired HUS values during write operations. In other examples, this may involve rearranging the order of layers (such as by repositioning any needed seed layers) to position the SULs to provide the desired HUS values during write operations. Note also that, if the HMS is less than the exemplary 10 nm, the SULs may be positioned lower within the HAMR stack to achieve the desired HUS values. On the other hand, if the HMS is greater than the exemplary 10 nm, the two SULs may be positioned higher within the HAMR stack to again achieve desired HUS values. In still other examples, the HMS of the drive may be adjusted to set the HUS to preferred or optimal values.

Figure 6:
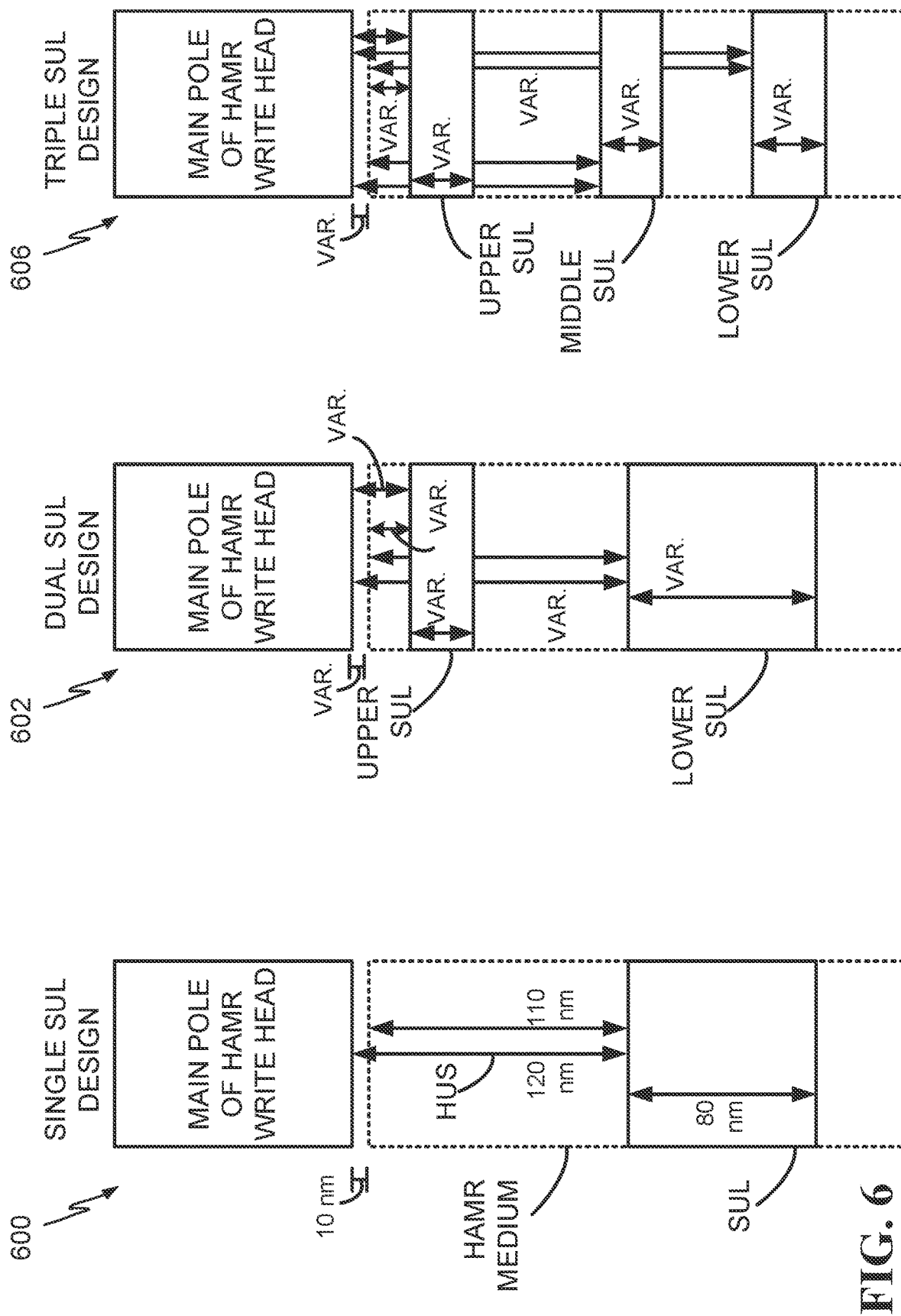
FIG. 6 are side schematic views of exemplary HAMR media and HAMR write heads, wherein the HAMR media include, in some examples, two or more SULs, in accordance with an aspect of the disclosure.

FIG. 6 highlights the flexibility of the positioning of the SUL layers. As in FIG. 5, a first design 600 illustrates a single SUL with particular thicknesses and HUS values. A second design 602 is a dual SUL design with an upper SUL and a lower SUL, which shows that each of the thickness and distance values (e.g., HUS values) are variable (VAR.) in the sense that they can be adjusted during the design phase of the HAMR media to achieve preferred or optimal HUS values or other parameters. A third design 606 is a triple SUL design with an upper SUL, a middle SUL, and a lower SUL, which again shows that each of the thickness and distance values are variable. Generally speaking, there can be N SUL layers, where N can be 2, 3, 4, or any practical number.

It should be understood that once a HAMR stack is fabricated the thicknesses of the various layers and their relative distances from the top and bottom of the stack are no longer variable but are fixed within the final structure. The variability occurs during the design phase.

In some examples, the relative thicknesses of the various SULs can be specified during the design phase in terms of thickness ratios. For example, the ratio of the thickness of the upper SUL to the lower SUL may be in the range of 1:2 to 1:5, depending upon the particular embodiment. In the design 502 of FIG. 5, where the upper SUL is 25 nm and the lower SUL is 80 nm, the ratio is 1:3.2. In the design 504 of FIG. 5, where the upper SUL is 25 nm and the lower SUL is 55 nm, the ratio is 1:2.2. In some aspects, the thicknesses of the SULs may be set to achieve a particular advantageous ratio, such as a ratio in the range of 1:2 to 1:4 or in the narrower range of 1:2.2 to 1:3.2. In some aspects, thicknesses are set to achieve a combined target thickness. For example, the combined target thicknesses for both the upper and lower SULs may be 80 nm (as in design 504 of FIG. 5), with the lower SUL made thinner (e.g., 55 nm) to accommodate the upper SUL (e.g., 25 nm).

Figure 7:
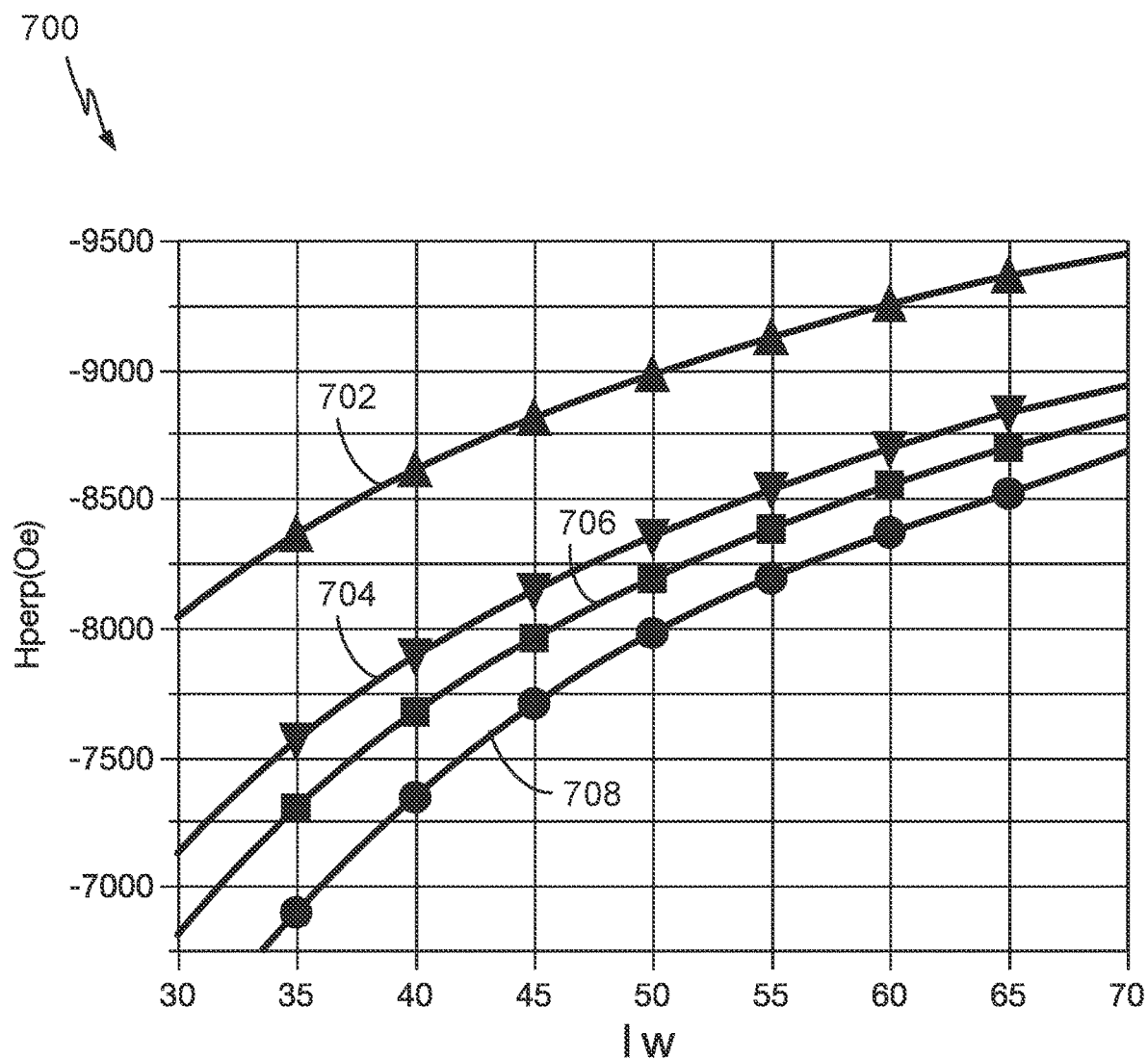
FIG. 7 includes a graph showing exemplary experimental results for various HAMR media designs including dual SUL designs, in accordance with an aspect of the disclosure.

FIG. 7 provides a graph 700 of exemplary finite-element modeling results for the four designs shown in FIG. 5. The Y-axis of the graph 700 represents the strength of the perpendicular magnetic field (Hperp) within an MRL of HAMR medium in oersteds (Oe). The X-axis shows the coil current, Iw, in mA that is used (supplied) to excite the write head. Write current, Iw, can be applied in a range of 30-130 mA, depending on the number of coil turns. In the modeling results presented here, the write head has a three-turn excitation coil.

A first curve 702 of FIG. 7 represents the first dual SUL design of FIG. 5: design 502. A second curve 704 represents the second dual SUL design of FIG. 5: design 504. A third curve 706 represents the third dual SUL design of FIG. 5: design 506. A fourth curve 708 represents the single SUL design of FIG. 5: design 500. As shown in FIG. 7, each of curves shows an increase in the strength of Hperp with increasing Iw. Moreover, each of the dual SUL designs exhibits an improvement relative to the single SUL design at each Iw value, with design 502 providing the best Hperp (as indicated by curve 702). As shown in FIG. 7, the largest relative improvement in field strength of the dual SUL designs as compared to the single SUL design is achieved at the smaller Iw values and hence at the highest write densities. This is further illustrated in the next figure.

Figure 8:
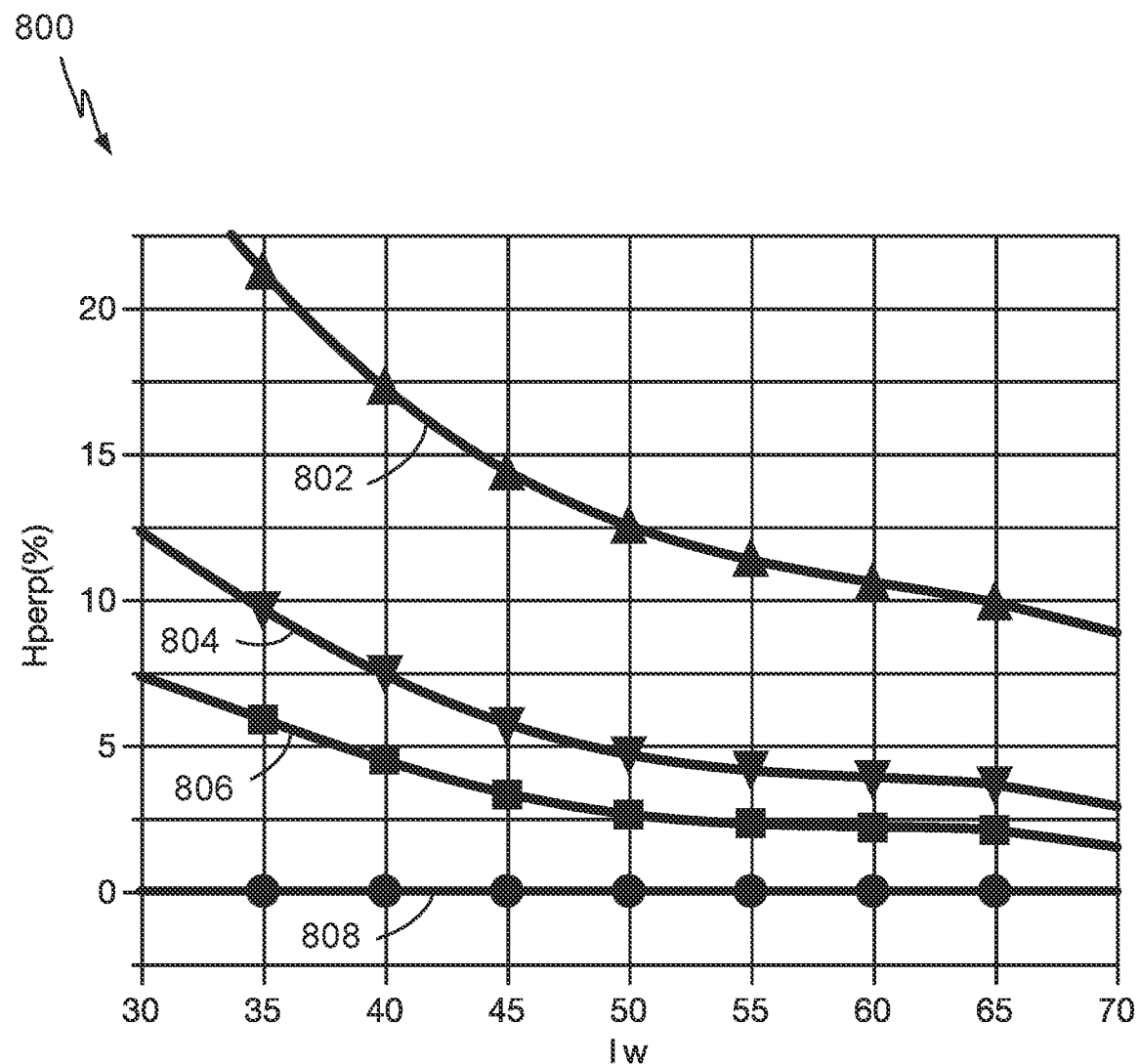
FIG. 8 includes a graph showing exemplary experimental results for various HAMR media designs including dual SUL designs, in accordance with an aspect of the disclosure, wherein the results for the dual SUL designs are presented as a percentage increase relative to a single SUL design.

FIG. 8 provides a graph 800 showing the same data as in FIG. 7 but with the increase in Hperp represented as a percentage increase relative to the single SUL design. That is, the Y-axis of the graph 800 represents a percentage increase in the strength of the Hperp magnetic field within an MRL of HAMR medium achieved using the dual SUL designs of FIG. 5 as compared to the baseline magnetic field strength achieved by the single SUL design of FIG. 5. The X-axis again shows Iw. FIG. 8 thus conveniently illustrates that when using the dual SUL designs, the highest increases in Hperp occur at the highest write densities.

Additional Examples and Embodiments

Figure 9:
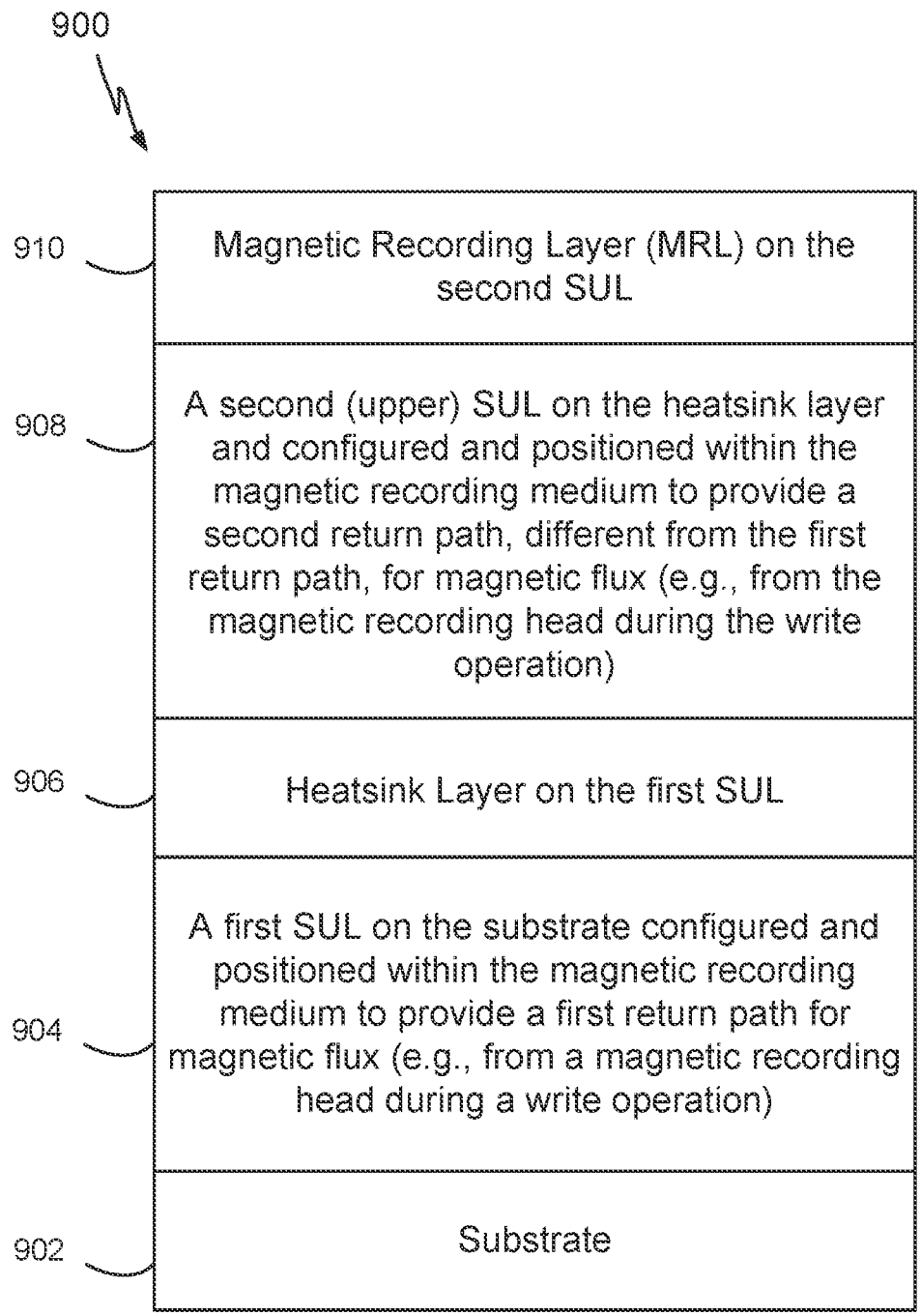
FIG. 9 is a side schematic view of an exemplary magnetic recording medium that includes at least two SULs on opposing sides of a heatsink layer, in accordance with an aspect of the disclosure.

FIG. 9 is a side schematic view of an exemplary magnetic recording medium 900 in accordance with another aspect of the disclosure. The medium 900 has a stacked structure with a substrate 902 and a first (lower) SUL 904 on the substrate 902, with the first SUL 904 configured and positioned within the magnetic recording medium 900 to provide a first return path (e.g., for magnetic flux from a magnetic recording head, not shown in FIG. 9, during a write operation). The medium 900 also has a heatsink layer 906 on the first SUL 904 and a second (upper) SUL 908 on the heatsink layer 906, with the second SUL 908 configured and positioned within the magnetic recording medium 900 to provide a second return path, different from the first return path, for magnetic flux (e.g., from the magnetic recording head during the write operation). An MRL 910 is on the second SUL 908. The medium 900 may be a HAMR medium.

In some aspects, the substrate 902 may be made of one or more materials such as an Al alloy, NiP-plated Al, glass, glass ceramic, and/or combinations thereof. In some aspects the heatsink layer 906 may be made of Cr. In some aspects, the MRL 910 may be made of FePt. In some aspects, the MRL 910 may be made instead of an alloy selected from FePtY, where Y is a material selected from Cu, Ni, and combinations thereof. In other aspects, the MRL 910 may be made instead of a CoPt alloy. In some aspects, the MRL 910 may be formed of high anisotropy $L1_0$ FePt with segregants.

In some examples, the MRL 910 may include one or more magnetic recording layers, which are not explicitly shown in FIG. 9. Additional layers of the HAMR media may be provided, as discussed above, such as MTO, MgO, seed layers, etc.

In some aspects, the first SUL 904 is configured and positioned by (a) configuring the SUL 904 with a particular material that has a high Bs, such as CoZrWMo, and with a particular SUL thickness, such as 55 nm or 80 nm (or within the range of 50-90 nm), and (b) positioning the SUL 904 within the medium to provide a selected HUS, such as an HUS of 120 nm or 145 nm (or within the range of 110-150 nm). For example, the first SUL 904 may be configured by selecting or fabricating a material that has a Bs above a Bs threshold, such as a Bs threshold of 1.2 T (or a Bs threshold in the range of, for example, 1.2-1.6 T). The actual positioning of the first SUL 904 within the medium to achieve a particular HUS may depend on the HMS of the drive that the media will be installed in. For example, if the HMS is fixed at 10 nm, the first SUL 904 is vertically positioned within the medium at a location relative to the top of the medium to achieve a particular desired HUS, such as 120 nm.

In some aspects, the second SUL 908 is configured and positioned by (a) configuring the SUL 908 with a particular material that has a high Bs, such as CoZrWMo, and with a particular SUL thickness, such as 25 nm (or within the range of 20-30 nm), and (b) positioning the SUL 908 within the medium to provide a selected HUS, such as an HUS of 35 nm (or within the range of 25-35 nm). For example, the second SUL 908 may be configured by selecting or fabricating a material that has a Bs above a Bs threshold, such as a Bs threshold of 1.2 T (or a Bs threshold in the range of, for example, 1.2-1.6 T). As with the lower SUL 904, the positioning of the upper SUL 908 within the medium to achieve a particular HUS may depend on the HMS of the drive that the media will be installed in. For example, if the HMS is fixed at 10 nm, the SUL 908 is positioned within the medium at a location relative to the top of the medium to achieve a particular desired HUS, such as 35 nm.

CoZrWMo is just one example of a suitable material for the SULs. Other soft magnetic materials may be used, such as Co, Fe, Ni with one or more of W, Mo, Ta, Nb, Cr. B, Si, or C, or combinations thereof. In some aspects, first and second SULs 904 and 908 can be made of CoZrWMo, CoW, NiFe, or CoNiFe, or combinations thereof. As noted above, in some examples, the SUL is formed of Co or CoFe alloys with Zr, B, Ta, W. Mo additives (to make the layer soft magnetic and amorphous). In some aspects, the first and second SULs 904 and 908 may be formed of different materials having different Bs values.

In some aspects, the first SUL 904 and the second SUL 908 are configured and positioned to achieve a perpendicular magnetic field strength within the magnetic recording layer that is greater in absolute magnitude than 7000 oersted and, e.g., is greater than 7500 oersted when using a write current Iw of 40 mA, where Iw is the write current supplied to writer coils of a 3-turn writer used to perform the write operation. (See, again, FIG. 7.)

In some aspects, the second SUL 908 is configured and positioned to increase a magnetic field strength within the magnetic recording layer of the medium during the write operation by at least 10% as compared to a magnetic field strength within the magnetic recording layer of a corresponding magnetic recording medium lacking the second SUL (e.g., identical magnetic recording medium except that it lacks the second SUL).

Figure 10:
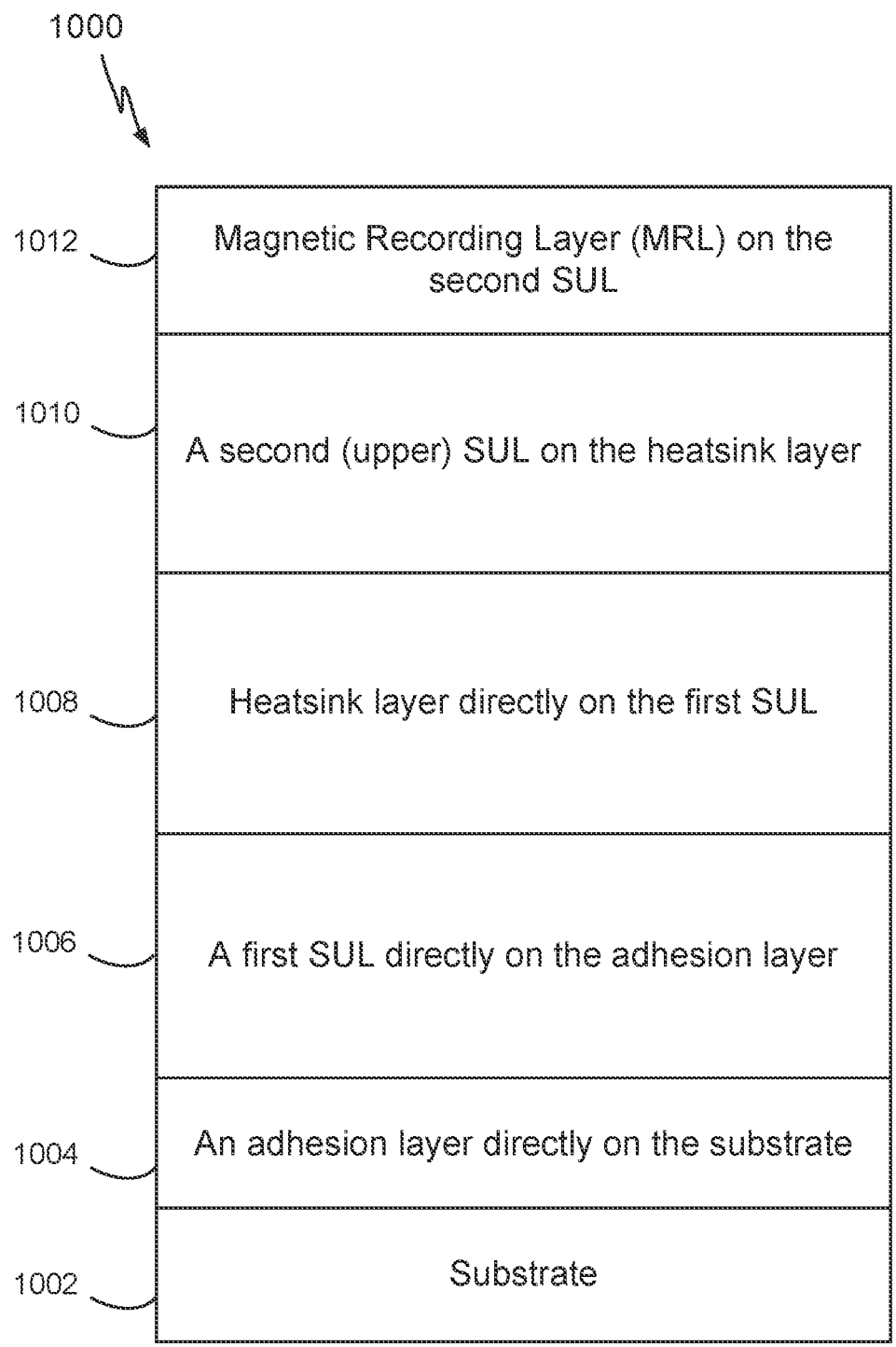
FIG. 10 is a side schematic view of another exemplary magnetic recording medium that includes at least two SULs on opposing sides of a heatsink layer, in accordance with an aspect of the disclosure, wherein at least some of the layers are formed directly on other layers.

FIG. 10 is a side schematic view of an exemplary magnetic recording medium 1000 in accordance with another aspect of the disclosure. The medium 1000 has a stacked structure with a substrate 1002 with an adhesion layer 1004 directly on the substrate 1002. A first (lower) SUL 1006 is directly on the adhesion layer 1004. The first SUL 1006 may be configured and positioned within the magnetic recording medium 1000 to provide a first return path for magnetic flux from a magnetic recording head (not shown in FIG. 10) during a write operation. In other examples, the adhesion layer 1004 may be omitted with the first SUL 1006 directly on the substrate 1002. The medium 1000 also has a heatsink layer 1008 directly on the first SUL 1006. A second (upper) SUL 1010 is on the heatsink layer 1008. The second SUL 1010 may be configured and positioned within the magnetic recording medium 1000 to provide a second return path, different from the first return path, for magnetic flux from the magnetic recording head during the write operation. An MRL 1012 is on the second SUL 1010. In some examples, the second SUL 1010 is directly on the heatsink layer 1008. In some examples, there are one or more additional layers such as a seed layer, an MTO layer and an MgO layer. For example, a seed layer may be directly on the second SUL, an MTO may be directly on the seed layer, and an MTO layer may be directly on the MgO layer, with the MRL directly on the MgO layer structure. In other examples, the seed layer includes the MTO and MgO layers. The medium may be a HAMR medium. Still other layers or films may be provided, as shown in FIG. 3. The various layers or films may be formed using the various materials described above.

Figure 11:
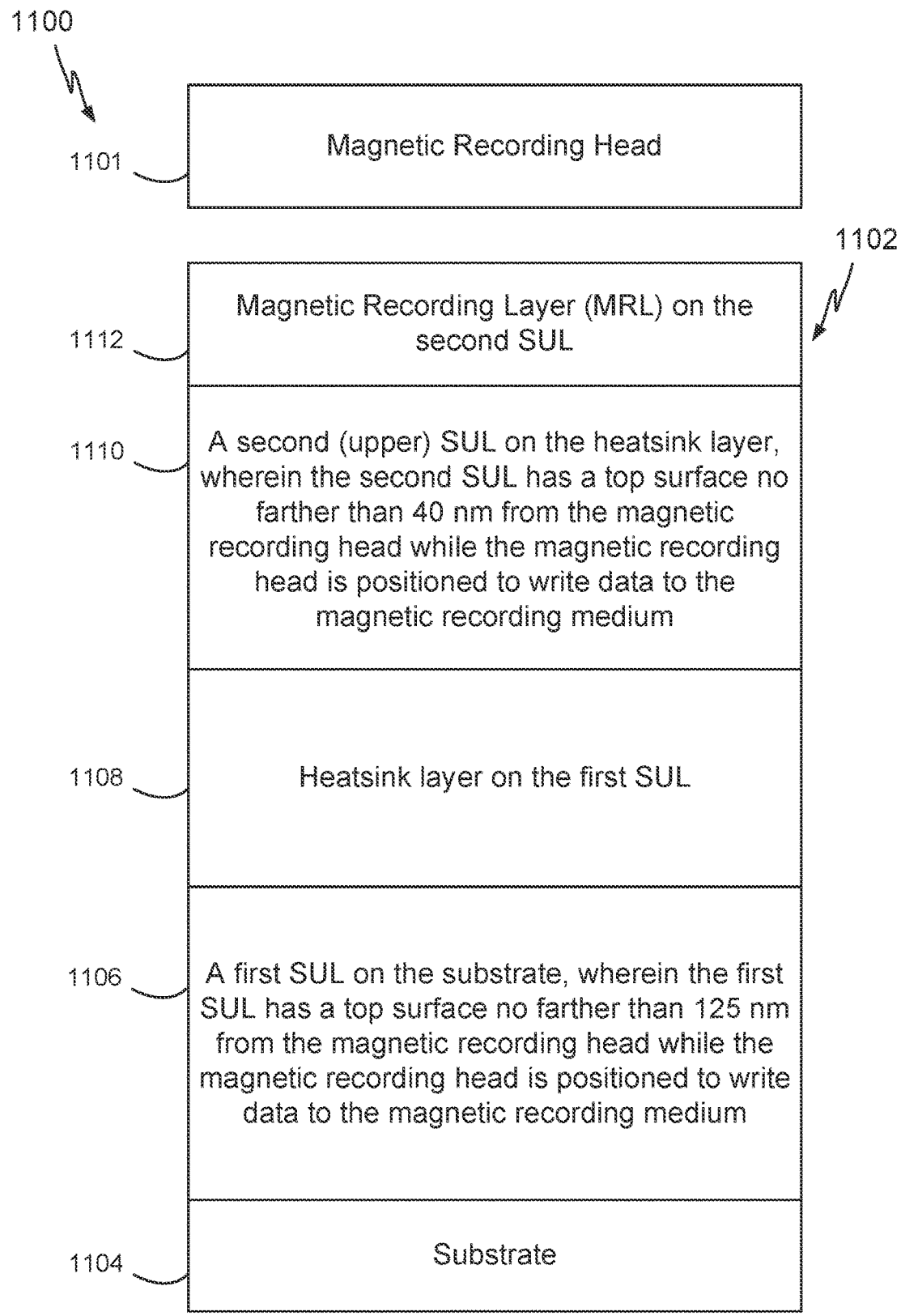
FIG. 11 is a side schematic view of an exemplary magnetic recording apparatus that includes a magnetic recording head and a magnetic recording medium, wherein the medium has at least two SULs on opposing sides of a heatsink layer, in accordance with an aspect of the disclosure.

FIG. 11 is a side schematic view of an exemplary magnetic recording apparatus 1100 in accordance with another aspect of the disclosure that includes a magnetic recording head 1101 and a magnetic recording medium 1102. The medium 1102 has a stacked structure with a substrate 1104. A first (lower) SUL 1106 is on the substrate 1104. In some examples, the first SUL 1106 is directly on the substrate 1104. In other examples, there is an intervening adhesion layer. The first SUL 1106 has a top surface no farther than 125 nm from a bottom surface of the magnetic recording head 1101 while the magnetic recording head is positioned to write data to the magnetic recording medium, wherein the distance is taken from a point on the top surface of the first SUL that is directly below the write head (i.e., wherein a line perpendicular to the top surface at that point intersects with a middle of the write head). The first SUL 1106 may have a thickness, for example, in the range of 55 nm to 80 nm. The medium 1102 also has a heatsink layer 1108 on the first SUL 1106. In some examples, the heatsink layer 1108 is directly on the first SUL 1106. A second (upper) SUL 1110 is on the heatsink layer 1108. The second SUL 1110 has a top surface no farther than 40 nm from the bottom surface of the magnetic recording head while the magnetic recording head is positioned to write data to the magnetic recording medium, wherein the distance is taken from a point on the top surface of the second SUL that is directly below the write head (i.e., wherein a line perpendicular to the top surface at that point intersects with a middle of the write head). The second SUL 1110 may have a thickness, for example, in the range of 10 nm to 30 nm, such as 25 nm. In some examples, the second SUL 1110 is directly on the heatsink layer 1108. An MRL 1112 is on the second SUL 1110. In some examples, there are one or more additional layers such as a seed layer, an MTO layer and an MgO layer. For example, a seed layer may be directly on the second SUL, an MTO may be directly on the seed layer, and an MTO layer may be directly on the MgO layer, with the MRL directly on the MgO layer structure. In other examples, the seed layer includes the MTO and MgO layers. The medium may be a HAMR medium. Still other layers or films may be provided, as shown in FIG. 3. The various layers or films may be formed using the various materials described above.

Figure 12:
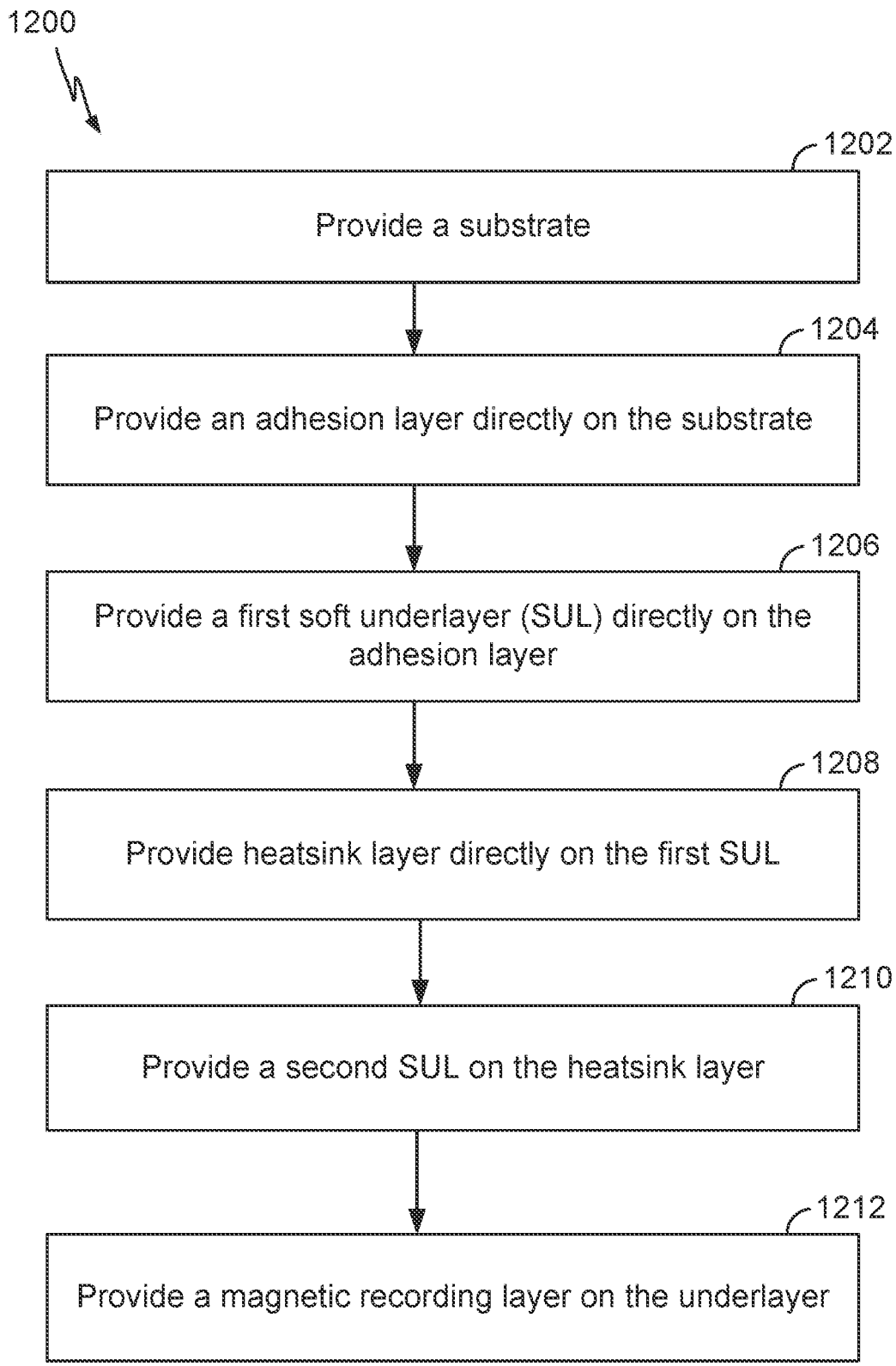
FIG. 12 is a flowchart of an exemplary process for fabricating a magnetic recording medium that includes at least two SULs on opposing sides of a heatsink layer, in accordance with an aspect of the disclosure.

FIG. 12 is a flowchart of a process 1200 for fabricating magnetic recording medium in accordance with some aspects of the disclosure. In one aspect, the process 1200 can be used to fabricate the media described above in relation to FIG. 9. In block 1202, the process provides a substrate. In block 1204, the process provides an adhesion layer directly on the substrate. In block 1206, the process provides a first SUL directly on the adhesion layer. In block 1208, the process provides a heatsink layer directly on the first SUL. In block 1210, the process provides a second SUL on heatsink layer. The second SUL may be directly on the heatsink layer but, in some examples, there may be one or more intervening layers. In block 1212, the process provides an MRL on the second SUL. The MRL may be directly on the second SUL but, in some examples, there may be one or more intervening layers, such as an MTO and MgO. For example, the process may provide a seed layer directly on the second SUL and an underlayer structure directly on the seed layer that includes materials selected from the group consisting of MgO and MgOTiO. The MRL may be provided directly on the underlayer structure. The medium that is fabricated may be a HAMR medium. In other examples, the adhesion layer is omitted and the first SUL is directly on the substrate.

ADDITIONAL ASPECTS

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising." "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to." "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on. The term "about 'value X'", or "approximately value X," as used in the disclosure shall mean within 10 percent of the 'value X'. For example, a value of about 1 or approximately 1, would mean a value in a range of 0.9-1.1. In one aspect, "about" as used herein may instead mean 5 percent. In this disclosure, various numerical values are presented. Unless specifically indicated otherwise, it is contemplated that these numerical values may have a tolerance of 10 percent. In another aspect, the tolerance may be 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. Various components described in this specification may be described as "including" or made of certain materials or compositions of materials. In one aspect, this can mean that the component consists of the particular material(s). In another aspect, this can mean that the component comprises the particular material(s).

As used herein, the term "determining" encompasses a wide variety of actions. For example. "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a substrate;
   a first soft underlayer (SUL) on the substrate, wherein the first SUL is configured and positioned within the magnetic recording medium to provide a first return path for magnetic flux;
   a heatsink layer on the first SUL;
   a second SUL on the heatsink layer, wherein the second SUL is configured and positioned within the magnetic recording medium to provide a second return path, different from the first return path, for magnetic flux; and
   a magnetic recording layer on the second SUL; and
   wherein the first SUL and the second SUL each comprises a material with a saturated magnetic flux density greater than 1.2 Tesla.

2. The magnetic recording medium of claim 1, wherein the first SUL and the second SUL each comprises CoZrWMo.

3. The magnetic recording medium of claim 1, wherein one or both of the first SUL and the second SUL comprises Co, Fe, or Ni with one or more of W, Mo, Ta, Nb, Cr, B, Si, or C, or combinations thereof.

4. The magnetic recording medium of claim 1, wherein the first SUL and the second SUL are configured and positioned to achieve a perpendicular magnetic field strength within the magnetic recording layer during a write operation that has an absolute magnitude greater than 7000 oersted.

5. The magnetic recording medium of claim 1, wherein the second SUL is configured and positioned to increase a magnetic field strength within the magnetic recording layer during a write operation by at least 10% as compared to a magnetic field strength within the magnetic recording layer of a corresponding magnetic recording medium without the second SUL.

6. The magnetic recording medium of claim 1, wherein the first SUL has a top surface about 110 nanometers (nm) from a top surface of the magnetic recording medium.

7. The magnetic recording medium of claim 1, wherein the first SUL has a top surface no greater than 120 nanometers (nm) from a top surface of the magnetic recording medium.

8. The magnetic recording medium of claim 1, wherein the second SUL has a top surface about 25 nanometers (nm) from a top surface of the magnetic recording medium.

9. The magnetic recording medium of claim 1, wherein the second SUL has a top surface no greater than 30 nanometers (nm) from a top surface of the magnetic recording medium.

10. The magnetic recording medium of claim 1, where the magnetic recording medium is configured for heat-assisted magnetic recording (HAMR).

11. A data storage device comprising:
a slider comprising a magnetic write head; and
the HAMR medium of claim 10,
wherein the slider is configured to write information to the magnetic recording layer of the HAMR medium during a write operation.

12. A magnetic recording medium comprising:
a substrate;
an adhesion layer directly on the substrate;
a first soft underlayer (SUL) directly on the adhesion layer;
a heatsink layer directly on the first SUL;
a second SUL on the heatsink layer;
a seed layer directly on the second SUL, the seed layer configured to provide a growth template for subsequently-deposited layers, the seed layer comprising materials selected from the group consisting of MgO and MgO—TiO; and
a magnetic recording layer on the seed layer.

13. The magnetic recording medium of claim 12, wherein the second SUL is directly on the heatsink layer.

14. A magnetic recording apparatus comprising:
a magnetic recording head; and
a magnetic recording medium comprising:
  a substrate;
  a first soft underlayer (SUL) on the substrate, wherein the first SUL has a top surface no farther than 125 nanometers (nm) from the magnetic recording head while the magnetic recording head is positioned to write data to the magnetic recording medium;
  a heatsink layer on the first SUL;
  a second SUL on the heatsink layer, wherein the second SUL has a top surface no farther than 40 nm from the magnetic recording head while the magnetic recording head is positioned to write data to the magnetic recording medium; and
  a magnetic recording layer on the second SUL.

15. A method for fabricating a magnetic recording medium, the method comprising:
providing a substrate;
providing an adhesion layer directly on the substrate;
providing a first soft underlayer (SUL) directly on the adhesion layer;
providing a heatsink layer directly on the first SUL;
providing a second SUL on the heatsink layer;
providing a seed layer directly on the second SUL, the seed layer configured to provide a growth template for subsequently-deposited layers, the seed layer comprising materials selected from the group consisting of MgO and MgO—TiO; and
providing a magnetic recording layer on the seed layer.

16. The method of claim 15, wherein the first SUL and the second SUL each comprises CoZrWMo.

17. A magnetic recording medium comprising:
a substrate;
a first soft underlayer (SUL) on the substrate;
a heatsink layer directly on the first SUL;
a second SUL on the heatsink layer;
a seed layer directly on the second SUL, the seed layer configured to provide a growth template for subsequently-deposited layers, the seed layer comprising materials selected from the group consisting of MgO and MgO—TiO; and
a magnetic recording layer on the seed layer.

* * * * *